(12) United States Patent
Bach et al.

(10) Patent No.: US 9,734,863 B2
(45) Date of Patent: Aug. 15, 2017

(54) ADJUSTABLE DUAL TENSIONING TONE ARM DEVICE AND ASSEMBLY

(71) Applicant: Gibson Brands, Inc., Nashville, TN (US)

(72) Inventors: Andrew Bach, Highland Park, CA (US); Gus Jursch, Agoura Hills, CA (US)

(73) Assignee: Gibson Brands, Inc., Nashville, TN (US)

( * ) Notice: Subject to any disclaimer, the term of this patent is extended or adjusted under 35 U.S.C. 154(b) by 0 days.

(21) Appl. No.: 14/896,137

(22) PCT Filed: Jun. 4, 2014

(86) PCT No.: PCT/US2014/040965
§ 371 (c)(1),
(2) Date: Dec. 4, 2015

(87) PCT Pub. No.: WO2014/197639
PCT Pub. Date: Nov. 12, 2014

(65) Prior Publication Data
US 2016/0125912 A1    May 5, 2016

Related U.S. Application Data

(60) Provisional application No. 61/831,081, filed on Jun. 4, 2013.

(51) Int. Cl.
*G11B 3/10* (2006.01)
*G11B 21/16* (2006.01)
(Continued)

(52) U.S. Cl.
CPC .............. *G11B 21/16* (2013.01); *G11B 3/02* (2013.01); *G11B 3/31* (2013.01); *G11B 3/32* (2013.01)

(58) Field of Classification Search
CPC ......... G11B 19/2018; G11B 3/02; G11B 3/08; G11B 3/09; G11B 3/092; G11B 3/095;
(Continued)

(56) References Cited

U.S. PATENT DOCUMENTS

| | | | | |
|---|---|---|---|---|
| 2,271,039 A | * | 1/1942 | Slade | ...................... G11B 3/20 |
| | | | | 369/255 |
| 3,380,744 A | * | 4/1968 | Ohnishi | ................. G11B 3/145 |
| | | | | 369/252 |

(Continued)

FOREIGN PATENT DOCUMENTS

GB         2008306 A        5/1979

OTHER PUBLICATIONS

Panasonic Puerto Rico, Inc., Turntable System, Model No. SL-1200MK5, 2003 [http://www.kabusa.com/SL1200MK5.pdf] pp. 4-7.

(Continued)

*Primary Examiner* — Carlos E Garcia
(74) *Attorney, Agent, or Firm* — Bates & Bates, LLC; Dan Beitey; Kathryn Cox

(57) ABSTRACT

A record player capable of playing phonographic records that may be played in a scratch style by a user. The record player includes a tonearm that is rotatably supported at or near an end of the tonearm by a structure having both horizontally and vertically fastening points to the tonearm. The fastening points are configured to receive a user activated tension adjustment element. A user may advance or retreat the tension adjustment element to selectably control the positioning, or relative tension in the tonearm such that any record skipping due to undesirable tonearm pressure is controlled, or to achieve a specific sound.

14 Claims, 4 Drawing Sheets

(51) Int. Cl.
*G11B 3/02* (2006.01)
*G11B 3/31* (2006.01)
*G11B 3/32* (2006.01)

(58) Field of Classification Search
CPC ........... G11B 3/12; G11B 3/121; G11B 3/122; G11B 3/124; G11B 3/14; G11B 3/145; G11B 3/16; G11B 3/18; G11B 3/20; G11B 3/22; G11B 3/28
USPC .................... 360/254.4, 254.9; 369/127, 253
See application file for complete search history.

(56) References Cited

U.S. PATENT DOCUMENTS

| | | | |
|---|---|---|---|
| 4,139,200 A | 2/1979 | Iyeta | |
| 4,154,445 A | 5/1979 | Joannou | |
| 4,302,834 A * | 11/1981 | Pretto | G11B 3/122 369/250 |
| 4,325,131 A | 4/1982 | Takeda et al. | |
| 4,686,664 A * | 8/1987 | Graham | G11B 3/14 33/613 |
| 7,944,803 B2 * | 5/2011 | Perkins | G11B 3/16 369/233 |
| 2004/0196775 A1 | 10/2004 | Schroder | |
| 2006/0203695 A1 | 9/2006 | Graham | |
| 2007/0008868 A1 * | 1/2007 | Riggle | G11B 3/00 369/245 |
| 2011/0080674 A1 | 4/2011 | Durand | |

OTHER PUBLICATIONS

European Search Report and Written Opinion; Dec. 22, 2016; p. 1-9; European Patent Office, Munich, Germany 80298.

* cited by examiner

ADJUSTABLE DUAL TENSIONING TONE ARM DEVICE AND ASSEMBLY

CROSS-REFERENCE TO RELATED APPLICATION

The present document is based on and claims priority to U.S. Provisional Patent Application Ser. No. 61/831,081 filed Jun. 4, 2013, the subject matter of which is incorporated herein by reference in its entirety.

FIELD OF THE INVENTION

The present invention relates to an adjustable dual tensioning tonearm device and assembly, and specifically to an adjustable dual tensioning tonearm device and assembly for use in a tonearm-suspension system record player.

BACKGROUND

A phonographic turntable, or record player, such as those used by DJ's for musical performances typically includes a tonearm suspension system to control the positioning of a phonographic needle at specific points on a phonographic record. The tonearm is typically controlled such that unwanted record skipping or excessive bearing wear is prevented. However, current tonearm tensioning controls are not adequate to prevent unwanted record skipping due to shock, vibration, and record movement, etc.

A dual tension tonearm suspension system that provides user selected tension in both the horizontal and vertical plane is desired.

DETAILED DESCRIPTION

Figure 1:
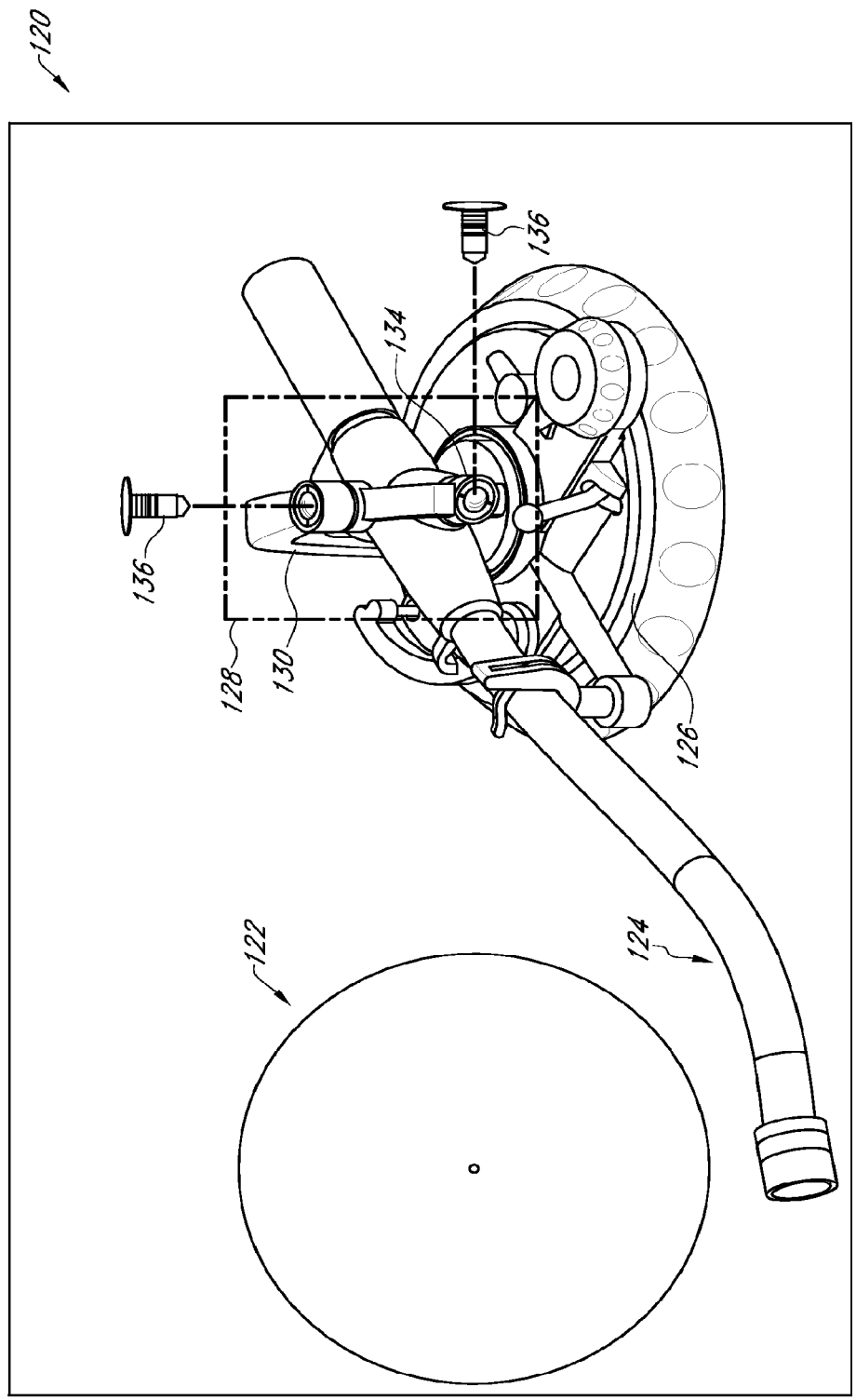
FIG. 1 is an isometric view of a phonographic device incorporating a dual tension tonearm suspension system.

The device will now be described with reference to the accompanying Figures. In all Figures, like numerals correspond to like elements. The device is directed to a dual tension tonearm device providing both horizontal and vertical tension control on the tonearm of a record player. One suitable embodiment of a record player, generally designated 120, is illustrated in FIG. 1. Specific details of the device and its use are disclosed more completely below.

By way of background, the term "record player" is intended to be directed to a wide variety of instruments that are designed to play phonographic records. Record player 120 may be those used strictly to play records in a single rotation direction as is the historical use of the device. In addition, record player 120 also includes those devices preferred by DJ's or other users who alter the record rotation direction and speed, as well as tonearm manipulation to achieve a desired sound in a "scratch" style made recently popular by hip-hop or similar genre performers.

With specific reference to FIG. 1, a suitable example of a record player 120 is depicted. General record players are know in the art, a discussion or depict on of all the elements is not provided herein as it is not necessary to understand the present disclosure. The record player 120 generally includes a turntable 122 for supporting and rotating a record (not shown) thereon. The record player 120 also includes a tonearm 124 that is rotatably supported by a tonearm suspension system 128. The tone arm suspension system 128 includes tension adjustment elements 136 configured to allow a user to selectively control the horizontal and vertical tension in the tonearm 124 to limit or prevent any unwanted needle movement on the record (not shown) or to achieve a desired movement, and thus sound characteristic.

The tonearm 124 depicted in FIG. 1 is what is commonly referred to in the industry as a "J shaped" tonearm. However, this disclosure is not limited to any specific tonearm 124 shape. Other common tonearm shapes such as straight, S shaped, or any other geometry tonearm 124 is considered within the scope of this disclosure.

With specific reference to FIGS. 1-5, a closer disclosure of the tension adjustment elements 136 and relevant portions of the tonearm suspension system 128 is provided. As will be appreciated by those skilled in the art, the tone arm suspension system 128 includes bearings 148 that provide selective movement between the tonearm 124 and the yolk 130. The tonearm suspension system 128 also includes gimbals 146 positioned to contain or somewhat contain the bearings 148 at their proper locations. Each gimbal 146 is configured to receive a tension adjustment element 136 that is user selectable to control pressure on the bearings 148 and thus tension in the tone arm 124.

The tension adjustment element 136 includes a fastener region 138, a biasing region 142 and a pin region 144. The fastener region 138 is configured to threadably engage the gimbal 146 such that the tension adjustment element 136 selectively engages or disengages the bearings 148. The fastener region 138 is configured to permit a full range of tension adjustment element 136 movement relative to the bearing 148 and tonearm 124. The tension adjustment element 136 may be selectively positioned so that it has no engagement of the bearings 148 thereby allowing full movement of the tonearm 124 in that specific plane. Also, the tension adjustment element 136 may be selectively positioned such that the bearings 148 are fully engaged thereby preventing tonearm 124 movement in that specific plane. Also, the tension adjustment element 136 may be selectively positioned to provide any degree of desired tonearm 124 movement control between such endpoints.

Figure 5:
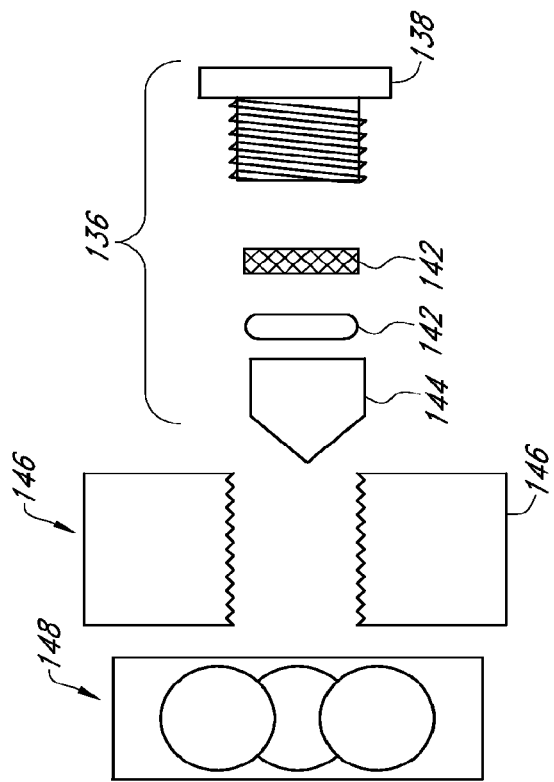
FIG. 5 is another alternative exploded plan view of an tensioning control assembly of the dual tension tonearm suspension system.
Figure 4:
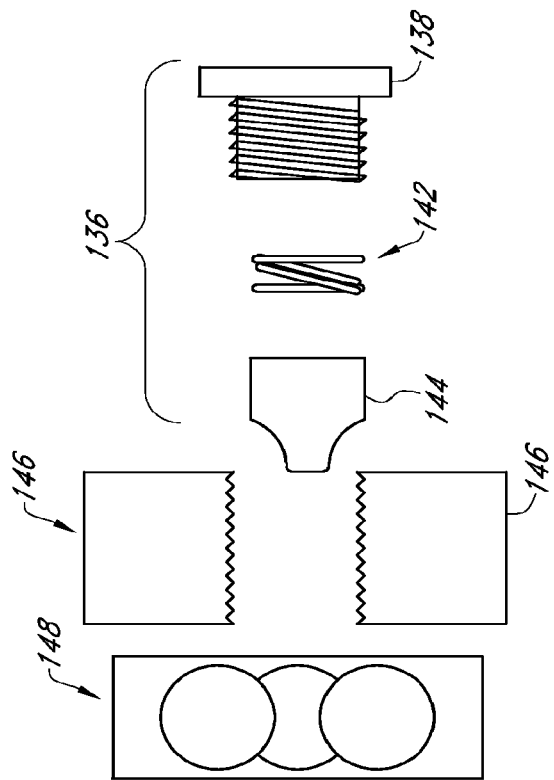
FIG. 4 is an alternative plan view of an tensioning control assembly of the dual tension tonearm suspension system.

The biasing region 142 is configured to slightly dampen the force applied by the fastener region 138 to the pin region (and thus bearings 148 and tonearm 124). This damping helps prevent damage to the bearings 148 and gives better micro movement control of tonearm tension to the user. As such, it will be appreciated that the biasing region 142 may constitute any material that is capable of some compression while still being able to transmit at least a portion of the compressive force on to the pin region. Suitable, non limiting examples of materials that may comprise the biasing region 142 includes, synthetic or non-synthetic fabrics, various polymers, felt, rubber, springs, or as best seen in FIG. 5, any combination of such materials.

Figure 3:
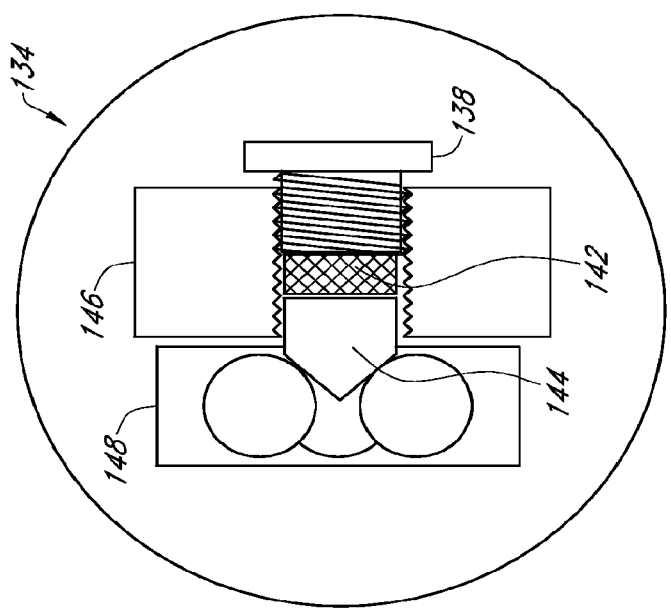
FIG. 3 is an plan view of an tensioning control assembly of the dual tension tonearm suspension system.
Figure 2:
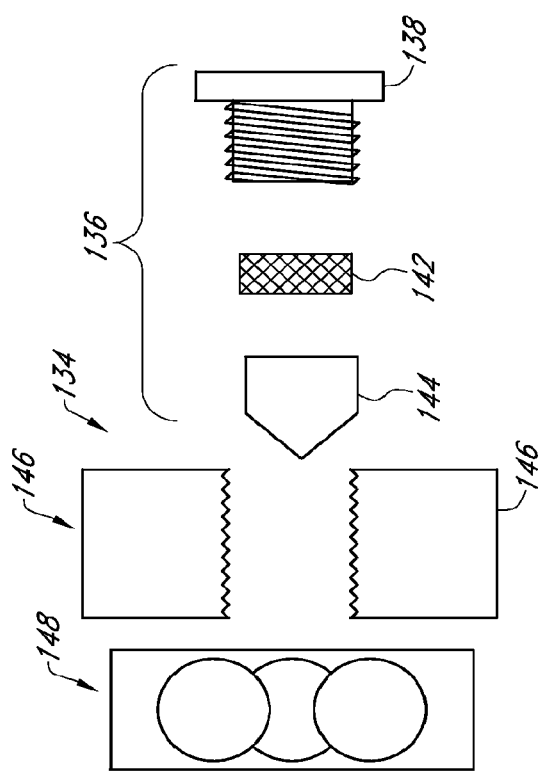
FIG. 2 is an exploded plan view of an tensioning control assembly of the dual tension tonearm suspension system.

The pin region 144 is typically configured to engage the bearings 148 in a manner that does not harm the bearings while still provided the desired user selected tension control. As best seen in FIGS. 2 and 3, the pin region 144 may include a pointed end for engaging the bearings 148. As will be understood by those skilled in the art, as the pin region 144 advances into the bearings 148 the force on the bearings 148 is increased, thereby increasing their resistance to movement. In another configuration best seen in FIG. 4, the pin region 144, which may also have a pointed (not show) or blunted end, may include concave portions shaped to receive the bearings 148 over an increased surface area to further help prevent damaging the bearings 148.

Figure 7:
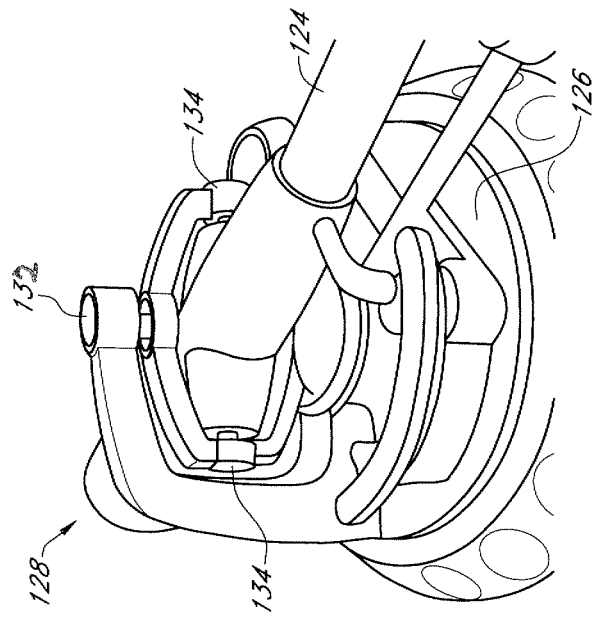
Figure 6:
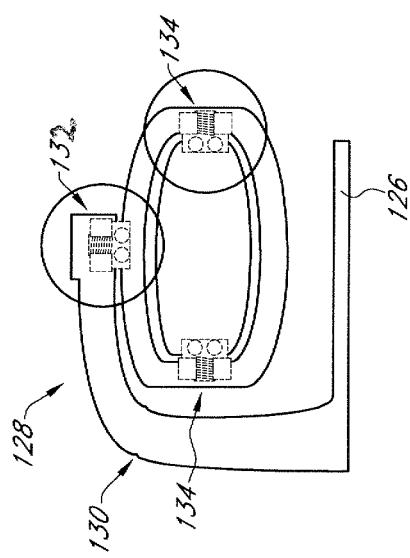
FIG. 6 is a plan view showing an aspect of tension control locations on a yolk and tonearm assembly; and, FIG. 7 is a partial isometric view of a dual tension tonearm suspension system as seen in FIG. 1.

FIGS. 1, 6 and 7 also illustrate a suitable location configuration for the tension adjustment elements 136 (also gimbals 146 and bearings 148 accordingly) relative to the tonearm 124 and tonearm suspension system 128. One configuration includes a vertical tension control 132 positioned substantially at the tonearm's point of rotation around a vertical axis. Likewise, horizontal tension controls 134 are positioned substantially opposite one another, on opposing sides of the tonearm 124. A main axis of the vertical tension control 132 is approximately 90 degrees from the main axis of the horizontal tension control 134. In this manner, by manipulation of the appropriate tension control, a user may control tonearm tension in one or both of the horizontal and vertical axes.

In an embodiment of this disclosure, there is a record player 120 adapted to a scratch performance operation for outputting a sound by directly rotating a phonographic record 122 in a forward or backward direction by a finger operation of an operator. The record player 120 includes a turntable (not show) driven to rotate around a first rotation core. Further included is a tonearm 124, having a first end and a second end, which is supported so as to be capable of horizontally swiveling around a rotating second rotation core positioned outside said turntable. Said tonearm 124 including a needle proximal the first end for tracking a record groove of said phonograph record 122 as viewed from a plane. Further included is a sensor (not shown) which is proximal the second end to detect a sound signal by said needle for tracking said record groove of said phonograph record. Still further included, a tonearm suspension system 128 proximal the second end wherein the tonearm suspension system 128 includes a vertical tension control element 132 and a horizontal tension control element 134, each configured to selectively control tension applied to the tonearm 124.

In an embodiment, the vertical tension control element includes a biasing element to provide selective tension control.

An aspect of an embodiment includes the biasing element being constructed from at least one of a synthetic or non-synthetic fabric, polymers, felt, rubber, coil spring, or combination thereof.

A further aspect includes the horizontal tension control element having a biasing element to provide selective tension control.

Yet a further aspect includes the biasing element being constructed from at least one of a synthetic or non-synthetic fabric, polymers, felt, rubber, coil spring, or combination thereof.

A still further aspect includes the vertical tension control element being a pin element movable in an axial direction substantially 90 degrees from a pin element integral with the horizontal tension control element.

An additional aspect includes the amount of tension applied to the vertical tension control element being not substantially equal to the amount of tension applied to the horizontal tension control element.

A still further aspect includes the amount of tension applied to the vertical tension control element is substantially equal to the amount of tension applied to the horizontal tension control element.

In an embodiment, there is a suspension system for a tonearm 124 of a record player 120 that includes a yolk 130 configured to moveably receive an end of the tonearm 124. Also included is a vertical tension control element integral to a portion of the yolk, the vertical tension control element includes a bearing element and a gimbal element adjacent one another. Further, a tension adjustment system 136 is threadably engageable with the gimbal element 146 and configured to selectably engage the bearing element 148. A horizontal tension control element 134 integral to a port on of the yolk, the vertical tension control element 132 including a bearing element and a gimbal element adjacent one another. And also including a tension adjustment elements 136 threadably engageable with the gimbal element 146 and configured to selectably engage the bearing element 148.

An aspect of an embodiment, further includes a biasing element configured to dampen the tension adjustment between the bearing element and the gimbal element upon activation of the tensioning element.

A further aspect includes the biasing element constructed from at least one of a synthetic or non-synthetic fabric, polymers, felt, rubber, coil spring, or combination thereof.

Another aspect includes the vertical tension control element and the horizontal tension control element are positioned approximately 90 degrees relative to one another and in substantially the same vertical plane.

Another aspect includes the vertical bearing element and the horizontal bearing element being conical.

Yet a further aspect includes the vertical bearing element and the horizontal bearing element having concave bearing element sections.

In an embodiment, there is a user selectable tension adjustment system 128 for use in selectably adjusting vertical or horizontal tension in a tonearm 124 of a record player 120. The system includes a fastener region 138 that is selectively advanceable along an axis. Also, a biasing region 142 proximal the fastener region 138. Also included, is a pin region 144 proximal the biasing region 142, opposite the fastener region 138, wherein the fastener region 138, the biasing region 142, and the pin region 144 are all rotatable along the same axis.

An aspect of an embodiment includes the vertical bearing element and the horizontal bearing element having conical bearing element sections.

A further aspect includes the vertical bearing element and the horizontal bearing element having concave bearing element sections.

Another aspect includes a biasing element in the biasing region, the biasing element being constructed from at least one of a synthetic or non-synthetic fabric, polymers, felt, rubber, coil spring, or combination thereof.

While various aspects of this disclosure have been illustrated and described, it will be appreciated that various changes can be made therein without departing from the spirit and scope of this disclosure. For example, without limitation, the fastener region 138 is depicted as not being flush with the gimbal's outer surface. A thumb screw configuration would be an example of such a fastener region 138 configuration. However, such a configuration is not the only configuration contemplated. The outer end of the fastener region 138 may be flush or counter sunk relative to the outer surface of the gimbals 138. In this manner the fastener region may mirror an Allen head or machine screw type fastener is contemplated. Any other configuration may also be use. Also, use of a single horizontal tension control element 134 is contemplated although not shown. Further, other variations and modifications apparent to those skilled in the art may be made within the nature of this disclosure.

What is claimed is:

1. A record player adapted to a scratch performance operation for outputting a sound by directly rotating a phonographic record in a forward or backward direction by a finger operation of an operator, comprising:
   a turntable driven to rotate around a first rotation core;
   a tonearm, having a first end and a second end, which is supported so as to be capable of horizontally swiveling around a rotating second rotation core positioned outside said turntable, said tonearm including a needle proximal the first end for tracking a record groove of said phonograph record as viewed from a plane;
   a sensor which is proximal the second end to detect a sound signal by said needle for tracking said record groove of said phonograph record and,
   a tonearm suspension system proximal the second end,
   wherein the tonearm suspension system includes a vertical tension control element configured to control movement of the tone arm in a vertical plane at the location of the vertical tension control element, the vertical tension control element being a center of rotation in the vertical plane for the tone arm and a horizontal tension control element configured to control movement of the tone arm in a horizontal plane at the location of the horizontal tension control element, the horizontal tension control element being a center of rotation in the horizontal plane for the tone arm.

2. The record player of claim 1, wherein the vertical tension control element includes a biasing element to provide selective tension control.

3. The record player of claim 2, wherein the biasing element is constructed from at least one of a synthetic or non-synthetic fabric, polymers, felt, rubber, coil spring, or combination thereof.

4. The record player of claim 1, wherein the horizontal tension control element includes a biasing element to provide selective tension control.

5. The record player of claim 4, wherein the biasing element is constructed from at least one of a synthetic or non-synthetic fabric, polymers, felt, rubber, coil spring, or combination thereof.

6. The record player of claim 1, wherein the vertical tension control element includes a pin element movable in an axial direction substantially 90 degrees from a pin element integral with the horizontal tension control element.

7. The record player of claim 1, wherein the amount of tension applied to the vertical tension control element is not substantially equal to the amount of tension applied to the horizontal tension control element.

8. The record player of claim 1, wherein the amount of tension applied to the vertical tension control element is substantially equal to the amount of tension applied to the horizontal tension control element.

9. A suspension system for a tonearm of a record player, comprising,
   a yolk configured to moveably receive an end of the tonearm;
   a vertical tension control element integral to a portion of the yolk, the vertical tension control element including a vertical bearing element and a vertical gimbal element adjacent one another, the vertical tension control element being configured to control movement of the tone arm in a vertical plane at the location of the vertical tension control element and the vertical tension control element being a center of rotation in the vertical plane for the tone arm;
   a tension adjustment system threadably engageable with the vertical gimbal element and configured to selectable engage the vertical bearing element; and,
   a horizontal tension control element integral to a portion of the yolk, the horizontal tension control element including a horizontal bearing element and a horizontal gimbal element adjacent one another, the horizontal tension control element being configured to control movement of the tone arm in a horizontal plane at the location of the horizontal tension control element and the horizontal tension control element being a center of rotation in the horizontal plane for the tone arm; and,
   a tension adjustment element threadably engageable with the gimbal element and configured to selectable engage the horizontal bearing element.

10. The suspension system of claim 9, further including a biasing element configured to dampen the tension adjustment between the bearing element and the gimbal element upon activation of the tensioning element.

11. The record player of claim 10, wherein the biasing element is constructed from at least one of a synthetic or non-synthetic fabric, polymers, felt, rubber, coil spring, or combination thereof.

12. The suspension system of claim 9, wherein the vertical tension control element and the horizontal tension control element are positioned approximately 90 degrees relative to one another and in substantially the same vertical plane.

13. The suspension system of claim 9, wherein the vertical bearing element and the horizontal bearing element are conical.

14. The suspension system of claim 9, wherein the vertical bearing element and the horizontal bearing element include concave bearing element sections.

* * * * *